US012628129B2

(12) United States Patent
Lin

(10) Patent No.: US 12,628,129 B2
(45) Date of Patent: May 12, 2026

(54) USER EQUIPMENT AND RESOURCE MONITORING METHOD IN SIDELINK COMMUNICATION

(71) Applicant: GUANGDONG OPPO MOBILE TELECOMMUNICATIONS CORP., LTD., Dongguan (CN)

(72) Inventor: Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 445 days.

(21) Appl. No.: 18/341,478

(22) Filed: Jun. 26, 2023

(65) Prior Publication Data

US 2023/0345422 A1     Oct. 26, 2023

Related U.S. Application Data

(63) Continuation of application No. PCT/CN2022/072587, filed on Jan. 18, 2022.
(Continued)

(51) Int. Cl.
*H04W 72/02* (2009.01)
*H04W 28/26* (2009.01)
(Continued)

(52) U.S. Cl.
CPC ........... *H04W 72/02* (2013.01); *H04W 28/26* (2013.01); *H04W 72/0446* (2013.01); *H04W 76/28* (2018.02); *H04W 92/18* (2013.01)

(58) Field of Classification Search
CPC . H04W 72/02; H04W 28/26; H04W 72/0446; H04W 76/28; H04W 52/0212;
(Continued)

(56) References Cited

U.S. PATENT DOCUMENTS

2021/0227602 A1* 7/2021 Li ......................... H04W 76/28
2022/0078758 A1* 3/2022 Lee ....................... H04L 5/0053
(Continued)

FOREIGN PATENT DOCUMENTS

| CN | 107734655 | 2/2018 |
| CN | 111869245 | 10/2020 |
| WO | 2018062980 | 4/2018 |

OTHER PUBLICATIONS

Mediatek Inc., "Resource allocation for sidelink power saving," 3GPP TSG RAN WG1 #103-e, R1-2008971, Oct. 2020.
(Continued)

*Primary Examiner* — Michael K Phillips
(74) *Attorney, Agent, or Firm* — Hodgson Russ LLP

(57) ABSTRACT
A user equipment (UE) and a resource monitoring method in sidelink communication are provided. The resource monitoring method in sidelink communication by the UE includes selecting a set of candidate slots within a resource selection window of a sidelink resource pool when partial sensing is configured in the UE by a higher layer and monitoring a slot $t_{y-k \times Preserve}$ in the sidelink resource pool for a set of $P_{reserve}$ and a set of k no earlier than $n-T_0$, wherein a slot $t_y$ is in the set of candidate slots, the set of $P_{reserve}$ comprises a subset of resource reservation periodicities, the set of k corresponds to one or more periodic sensing occasions, and $T_0$ is a length of a sensing window.

20 Claims, 4 Drawing Sheets

410

412 — Selecting a set of candidate slots within a resource selection window of a sidelink resource pool when partial sensing is configured in the UE by a higher layer 414 — Monitoring a slot $t_{y-k \times Preserve}$ in the sidelink resource pool for a set of $P_{reserve}$ and a set of $k$ no earlier than $n$-$T_0$, wherein a slot $t_y$ is in the set of candidate slots, the set of $P_{reserve}$ comprises a subset of resource reservation periodicities, the set of $k$ corresponds to one or more periodic sensing occasions, and $T_0$ is a length of a sensing window

Related U.S. Application Data

(60) Provisional application No. 63/139,191, filed on Jan. 19, 2021.

(51) Int. Cl.

| | | |
|---|---|---|
| *H04W 72/0446* | (2023.01) | |
| *H04W 76/28* | (2018.01) | |
| *H04W 92/18* | (2009.01) | |

(58) Field of Classification Search
CPC ......... H04W 52/0229; H04W 52/0274; H04W 72/40; H04W 74/0808; H04W 76/14; H04W 92/18
See application file for complete search history.

(56) References Cited

U.S. PATENT DOCUMENTS

| | | | | |
|---|---|---|---|---|
| 2022/0086803 A1* | 3/2022 | Li | .................... | H04W 72/0453 |
| 2023/0142670 A1* | 5/2023 | Mohammad Soleymani | .............. | H04W 72/02 370/329 |
| 2023/0189220 A1* | 6/2023 | Liu | ...................... | H04W 72/04 370/329 |
| 2023/0254878 A1* | 8/2023 | Dong | ................... | H04W 76/14 |

OTHER PUBLICATIONS

WIPO, International Search Report and Written Opinion for PCT/CN2022/072587, Apr. 8, 2022.
EPO, Extended European Search Report issued for EP Application No. 22742165.8, Mar. 27, 2024.

* cited by examiner

30

Figure 4:
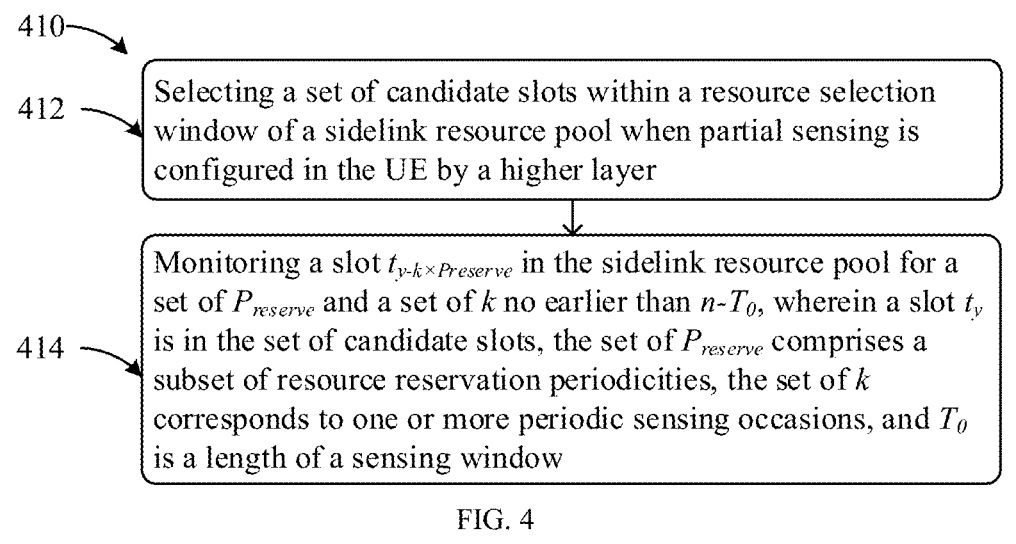

410

412 Selecting a set of candidate slots within a resource selection window of a sidelink resource pool when partial sensing is configured in the UE by a higher layer 414 Monitoring a slot $t_{y-k \times Preserve}$ in the sidelink resource pool for a set of $P_{reserve}$ and a set of $k$ no earlier than $n$-$T_0$, wherein a slot $t_y$ is in the set of candidate slots, the set of $P_{reserve}$ comprises a subset of resource reservation periodicities, the set of $k$ corresponds to one or more periodic sensing occasions, and $T_0$ is a length of a sensing window

USER EQUIPMENT AND RESOURCE MONITORING METHOD IN SIDELINK COMMUNICATION

CROSS-REFERENCE

This application is a continuation of International Patent Application No. PCT/CN2022/072587, filed Jan. 18, 2022, which claims priority to U.S. Provisional Application No. 63/139,191, filed Jan. 19, 2021, the entire disclosures of which are incorporated herein by reference.

BACKGROUND OF DISCLOSURE

1. Field of the Disclosure

The present disclosure relates to the field of communication systems, and more particularly, to a user equipment (UE) and a resource monitoring method in sidelink (SL) communication, which can provide a good communication performance and/or provide high reliability.

2. Description of the Related Art

For an existing sidelink (SL) communication technology defined by 3GPP in Release 16, in order for a UE to select physical sidelink shared channel (PSSCH) resources for its own transmissions and to avoid collision with others (i.e., avoiding selecting resources already reserved by other UEs), the UE performs sensing in every slot of a SL resource pool for a duration of time (i.e., within a sensing window in the past) to obtain resource reservation information in physical sidelink control channel (PSCCH) transmitted from other UEs and to measure their sidelink reference signal received power (RSRP) levels, except for slots in which the UE own transmissions occur. Further, the UE continues to perform sensing in every slot after the resource selection up until the selected transmission resource occasions for re-evaluation and pre-emption checking by the UE to ensure collision free transmission. This kind of rigorous reservation monitoring and usage checking of all SL resources is commonly referred as full sensing operation.

To achieve power saving for pedestrian UEs (P-UEs) with limited battery power supply, random resource selection scheme based on no sensing at all and SL resource selection based on partial sensing scheme were introduced for P2X communication in 4th generation (4G) long term evolution (LTE) version of SL technology. The common assumption of the same traffic pattern, however, can no longer hold true and it should not be used as the basis for designing a new power saving based resource allocation scheme for 5th generation (5G) new radio (NR) SL communication. Since the use of NR-SL technology targets to support wider range of applications and services other than just P2X traffic as mentioned earlier, device UEs with limited power supply may be used for public safety voice communication, AR/VR gaming, and the device UEs may start to receive and decode SL data transmitted from others to be able to in communication with one another. As such, it becomes even more important to reduce/limit power consumption for the device UEs.

SUMMARY

In a first aspect of the present disclosure, a user equipment (UE) includes a memory, a transceiver, and a processor coupled to the memory and the transceiver. The processor is configured to select a set of candidate slots within a resource selection window of a sidelink resource pool when partial sensing is configured in the UE by a higher layer. The processor is configured monitor a slot $t_{y-k\times Preserve}$ in the sidelink resource pool for a set of $P_{reserve}$ and a set of k no earlier than $n-T_0$, wherein a slot $t_y$ is in the set of candidate slots, the set of $P_{reserve}$ comprises a subset of resource reservation periodicities, the set of k corresponds to one or more periodic sensing occasions, and $T_0$ is a length of a sensing window.

In a second aspect of the present disclosure, a resource monitoring method in sidelink communication by a user equipment (UE) includes selecting a set of candidate slots within a resource selection window of a sidelink resource pool when partial sensing is configured in the UE by a higher layer and monitoring a slot $t_{y-k\times Preserve}$ in the sidelink resource pool for a set of $P_{reserve}$ and a set of k no earlier than $n-T_0$, wherein a slot $t_y$ is in the set of candidate slots, the set of $P_{reserve}$ comprises a subset of resource reservation periodicities, the set of k corresponds to one or more periodic sensing occasions, and $T_0$ is a length of a sensing window.

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 4 is a flowchart illustrating a resource monitoring method in sidelink communication by a user equipment (UE) according to an embodiment of the present disclosure.

DETAILED DESCRIPTION OF EMBODIMENTS

Figure 1:
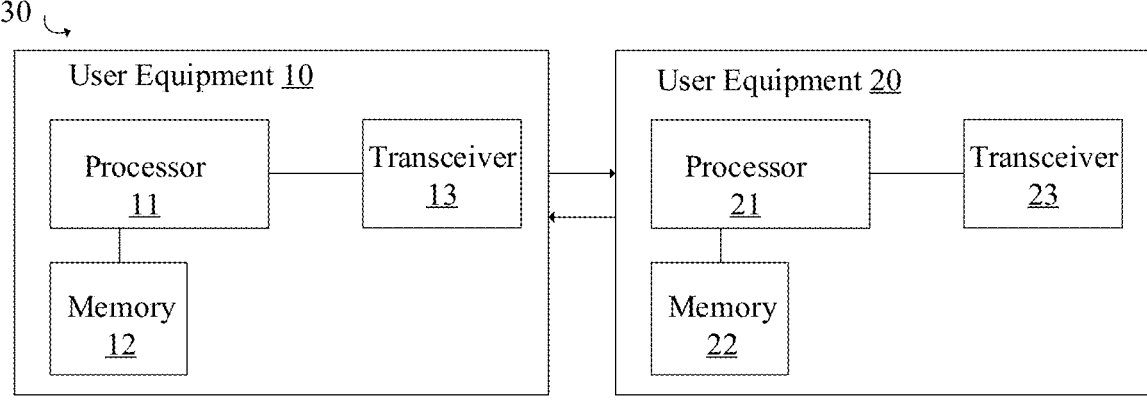
FIG. 1 is a block diagram of user equipments (UEs) of communication in a communication network system according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

For the development of direct device-to-device (D2D) wireless technology standards in 3rd generation partnership project (3GPP), such as sidelink communication, the main focus and priority has so far been placed on vehicle-to-everything (V2X) communication related road safety use cases, where communicating devices/user equipment (UE) installed on vehicles are assumed to have unlimited supply of power. Since the design and utilization of sidelink (SL) communication technology can be easily extended to cover wider range of applications and uses such as pedestrians/ vulnerable road users (VRUs) transmissions in pedestrian-to-everything (P2X) communication, direct D2D communication among public safety workers and extended reality (XR) gaming data exchange with nearby players, consumption of UE battery power due to SL radio reception and transmission would become one of the critical factors determining the feasibility, user experience and success of such application/extension. Therefore, the power saving aspect of the existing SL communication technology should be enhanced for portable user terminals such as helmets for cyclists, pedestrian smartphones, augmented reality (AR)/ virtual reality (VR) headset devices or glasses, and emergency personnel on-body/backpack communication units.

For an existing sidelink (SL) communication technology defined by 3GPP in Release 16, in order for a UE to select physical sidelink shared channel (PSSCH) resources for its own transmissions and to avoid collision with others (i.e., avoiding selecting resources already reserved by other UEs), the UE performs sensing in every slot of a SL resource pool for a duration of time (i.e., within a sensing window in the past) to obtain resource reservation information in physical sidelink control channel (PSCCH) transmitted from other UEs and to measure their sidelink reference signal received power (RSRP) levels, except for slots in which the UE own transmissions occur. Further, the UE continues to perform sensing in every slot after the resource selection up until the selected transmission resource occasions for re-evaluation and pre-emption checking by the UE to ensure collision free transmission. This kind of rigorous reservation monitoring and usage checking of all SL resources is commonly referred as full sensing operation.

Beside sensing for the purpose of gaining knowledge of utilization and reservation status of SL resources, the UE decodes PSCCH and extracts sidelink control information (SCI) also for the purpose of decoding SL user data transmitted in PSSCH from other UEs. As such, for the V2X application, a Release 16 SL UE should always sense PSCCH transmissions and receive PSSCH from others in order to maintain road safety messages. Moreover, this full sensing operation is also very useful for selecting resources and transmitting SL data with aperiodic traffic pattern, since the timing of traffic generated from UE upper layers is unpredictable. Without the continuous sensing, the transmitter UE cannot guarantee the resource it selects has not been reserved by another UE. However, all these benefits of the full sensing operation come at a high cost of consuming a lot of UE processing power and drain device battery power quickly.

To achieve power saving for pedestrian UEs (P-UEs) with limited battery power supply, random resource selection scheme based on no sensing at all and SL resource selection based on partial sensing scheme were introduced for P2X communication in 4th generation (4G) long term evolution (LTE) version of SL technology. In the LTE-SL, it is always assumed the generation of P2X traffic is infrequent, periodic and predicable (i.e., one packet transport block (TB) per second), the required radio latency for transmitting P2X TB is fixed (i.e., 100 ms), and the target reliability/success rate is not very stringent (i.e., only 90%). Furthermore, it was also assumed that P-UE does not perform reception of PSSCH transmitted from other UEs (e.g., vehicle UEs).

Instead, it relies on the vehicle UEs to receive SL information/warning messages transmitted by P-UEs in order to avoid accidents on the road and maintain road safety while minimizing the consumption of reception, processing and transmission power for P-UEs. Since the SL operation was kept very simple for P-UEs in LTE-V2X, the design for the partial sensing was also inflexible and cannot be adapted to variation in traffic patterns and transmission (Tx) parameters. That is, when P-UEs are configured to operate in UE autonomous resource allocation mode, the minimum number of subframes for resource selection, the step size ($P_{step}$) which determines the interval/frequency for the partial sensing and the time gap (k) between candidate resource subframes are all pre-configured or fixed, and the same set of values are applied for all P-UEs operating in the same resource pool. The main reason behind this "one size fits all" partial sensing operation design is due to the expected types of SL services and transmission patterns to be supported by power constrained P-UEs are very limited. As such, even if packet priority, latency requirement, TB size, and remaining device battery power are different among UEs operating in the same resource pool, all of the UEs will apply the same set of partial sensing parameters and values.

This common assumption of the same traffic pattern, however, can no longer hold true and it should not be used as the basis for designing a new power saving based resource allocation scheme for the 5th generation (5G) new radio (NR) SL communication. Since the use of NR-SL technology targets to support wider range of applications and services other than just P2X traffic as mentioned earlier, device UEs with limited power supply may be used for public safety voice communication, AR/VR gaming, and they will start having to receive and decode SL data transmitted from others to be able to in communication with one another. As such, it becomes even more important to reduce/ limit power consumption for these device UEs.

For the present proposed method for periodic-based partial resource sensing in sidelink communication, some embodiments aim to avoid the above problem of inflexible sensing pattern, while minimizing the total amount of resource sensing needed to sufficiently cover possible different sidelink traffic characteristics allowed in a resource pool by performing SL monitoring only in periodic slots that corresponds to a limited set of candidate selection resources. Moreover, the number of periodic sensing occasions is also minimized to further reduce the total sensing slots for UE power saving. By doing so, NR-SL communication with partial sensing will not only be able to flexibly support wider range of direct device-to-device (D2D) applications and services with different traffic characteristics, it can be also used to adapt to SL-DRX operation if it is configured. Other benefits of adopting the newly proposed partial resource selection method for NR sidelink communication include flexible adaptation and integration with SL discontinuous reception (DRX) operation and/or reduction of transmission latency from selecting earlier candidate slots of resources.

FIG. 1 illustrates that, in some embodiments, one or more user equipments (UEs) 10 (such as a first UE) and one or more user equipments (UEs) 20 (such as a second UE) of communication in a communication network system 30 according to an embodiment of the present disclosure are provided. The communication network system 30 includes one or more UEs 10 and one or more UE 20. The UE 10 may include a memory 12, a transceiver 13, and a processor 11 coupled to the memory 12 and the transceiver 13. The UE 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21 and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V21/N) according to a sidelink technology developed under 3rd generation partnership project (3GPP) long term evolution (LTE) and new radio (NR) Release 17 and beyond. UEs are communicated with each other directly via a sidelink interface such as a PC5 interface. Some embodiments of the present disclosure relate to sidelink communication technology in 3GPP NR release 17 and beyond, for example providing cellular-vehicle to everything (C-V2X) communication.

In some embodiments, the UE 10 may be a sidelink packet transport block (TB) transmission UE (Tx-UE). The UE 20 may be a sidelink packet TB reception UE (Rx-UE) or a peer UE. The sidelink packet TB Rx-UE can be configured to send ACK/NACK feedback to the packet TB Tx-UE. The peer UE 20 is another UE communicating with the Tx-UE 10 in a same SL unicast or groupcast session.

Figure 2:
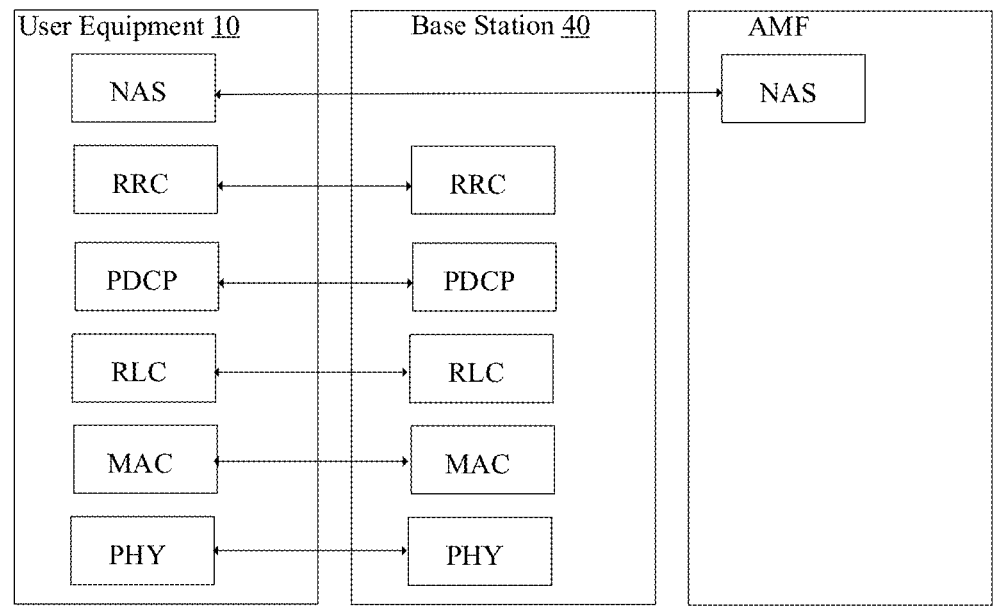
FIG. 2 is a schematic diagram illustrating a user plane protocol stack according to an embodiment of the present disclosure.

FIG. 2 illustrates a user plane protocol stack according to an embodiment of the present disclosure. FIG. 2 illustrates that, in some embodiments, in the user plane protocol stack, where service data adaptation protocol (SDAP), packet data convergence protocol (PDCP), radio link control (RLC), and media access control (MAC) sublayers and physical (PHY) layer may be terminated in a UE 10 and a base station 40 (such as gNB) on a network side. In an example, a PHY layer provides transport services to higher layers (e.g., MAC, RRC, etc.). In an example, services and functions of a MAC sublayer may comprise mapping between logical channels and transport channels, multiplexing/demultiplexing of MAC service data units (SDUs) belonging to one or different logical channels into/from transport blocks (TBs) delivered to/from the PHY layer, scheduling information reporting, error correction through hybrid automatic repeat request (HARQ) (e.g. one HARQ entity per carrier in case of carrier aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or transmission time interval (TTI) durations. In an example, automatic repeat request (ARQ) may operate on any of the numerologies and/or TTI durations the logical channel is configured with. In an example, services and functions of the PDCP layer for the user plane may comprise sequence numbering, header compression, and decompression, transfer of user data, reordering and duplicate detection, PDCP PDU routing (e.g., in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping quality of service Indicator (QFI) in downlink (DL) and uplink (UL) packets. In an example, a protocol entity of SDAP may be configured for an individual PDU session.

Figure 3:
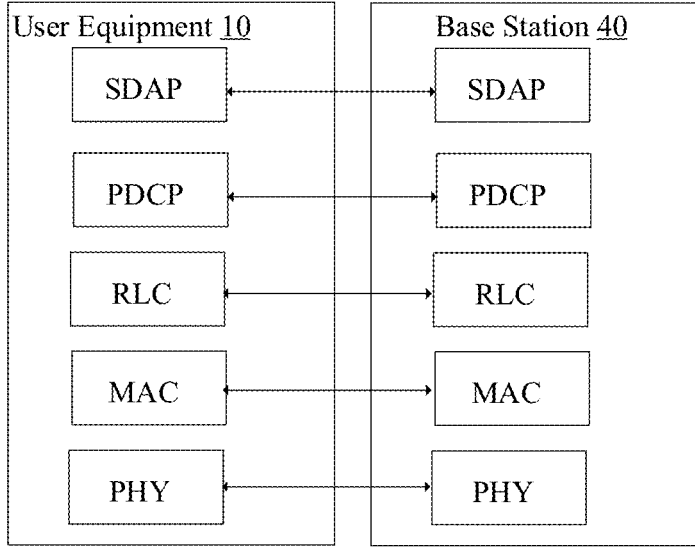
FIG. 3 is a schematic diagram illustrating a control plane protocol stack according to an embodiment of the present disclosure.

FIG. 3 illustrates a control plane protocol stack according to an embodiment of the present disclosure. FIG. 3 illustrates that, in some embodiments, in the control plane protocol stack where PDCP, RLC, and MAC sublayers and PHY layer may be terminated in a UE 10 and a base station 40 (such as gNB) on a network side and perform service and functions described above. In an example, RRC used to control a radio resource between the UE and a base station (such as a gNB).

In an example, RRC may be terminated in a UE and the gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of signaling radio bearers (SRBs) and data radio bearers (DRBs), mobility functions, QoS management functions, UE measurement reporting and control of the reporting, detection of and recovery from radio link failure, and/or non-access stratum (NAS) message transfer to/from NAS from/to a UE. In an example, NAS control protocol may be terminated in the UE and AMF on a network side and may perform functions such as authentication, mobility management between a UE and an AMF for 3GPP access and non-3GPP access, and session management between a UE and a SMF for 3GPP access and non-3GPP access.

When a specific application is executed and a data communication service is required by the specific application in the UE, an application layer taking charge of executing the specific application provides the application-related information, that is, the application group/category/priority information/ID to the NAS layer. In this case, the application-related information may be pre-configured/defined in the UE. (Alternatively, the application-related information is received from the network to be provided from the AS (RRC) layer to the application layer, and when the application layer starts the data communication service, the application layer requests the information provision to the AS (RRC) layer to receive the information.)

In some embodiments, the processor 11 is configured to select a set of candidate slots within a resource selection window of a sidelink resource pool when partial sensing is configured in the UE by a higher layer of the UE 10. The processor 11 is configured to monitor a slot $t_{y-k \times Preserve}$ in the sidelink resource pool for a set of $P_{reserve}$ and a set of k no earlier than $n-T_0$, wherein a slot $t_y$ is in the set of candidate slots, the set of $P_{reserve}$ comprises a subset of resource reservation periodicities, the set of k corresponds to one or more periodic sensing occasions, and $T_0$ is a length of a sensing window. This can solve issues in the prior art, reduce/limit power consumption, provide a good communication performance, and/or provide high reliability.

FIG. 4 illustrates a resource monitoring method 410 in sidelink communication by a user equipment (UE) according to an embodiment of the present disclosure. In some embodiments, the method 410 includes: a block 412, selecting a set of candidate slots within a resource selection window of a sidelink resource pool when partial sensing is configured in the UE by a higher layer, and a block 414, monitoring a slot $t_{y-k \times Preserve}$ in the sidelink resource pool for a set of $P_{reserve}$ and a set of k no earlier than $n-T_0$, wherein a slot $t_y$ is in the set of candidate slots, the set of $P_{reserve}$ comprises a subset of resource reservation periodicities, the set of k corresponds to one or more periodic sensing occasions, and $T_0$ is a length of a sensing window. This can solve issues in the prior art, reduce/limit power consumption, provide a good communication performance, and/or provide high reliability.

In some embodiments, when a mode 2 resource allocation procedure is triggered in a slot n to determine a subset of resources for sidelink transmission, one or more of following parameters are provided by a higher layer of the UE, and the one or more of following parameters comprise a sidelink resource pool identifier and/or index; a first layer (L1) priority for the sidelink transmission $Prio_{Tx}$; a non-zero resource reservation interval for the sidelink transmission $P_{rsvp\_Tx}$; a minimum and/or maximum number of candidate slots for resource selection; a list of possible resource reservation periods allowed for the sidelink resource pool; or a sidelink discontinuous reception (DRX) active/inactive period and/or timer. In some embodiments, the set of $P_{reserve}$ comprises at least one value from the list of possible resource reservation periods allowed for the sidelink resource pool. In some embodiments, the set of candidate slots is bounded by a minimum and/or maximum value.

In some embodiments, the set of $P_{reserve}$ is radio resource control (RRC) configured by a base station or pre-configured. In some embodiments, the set of k corresponds to at least most recent one or two periodic sensing occasions for a given periodicity $P_{reserve}$. In some embodiments, the periodic sensing occasions are derived based on the set of candidate slots, the set of $P_{reserve}$, and the set of k. In some embodiments, monitoring the slot $t_{y-k \times Preserve}$ in the sidelink resource pool for the set of $P_{reserve}$ the set of k comprises monitoring sidelink resources in a subset of periodic sensing occasions when a sidelink DRX is configured. In some embodiments, the method further comprises selecting only subset of periodic sensing occasions aligning with a sidelink DRX cycle. In some embodiments, the sidelink transmission comprises a physical sidelink control channel (PSCCH) and/or physical sidelink shared channel (PSSCH) transmission. In some embodiments, after determining the set of candidate slots within the resource selection window, the method further comprises resource monitoring by decoding a PSCCH and measuring a reference signal received power (RSRP) level.

In some embodiments, an inventive periodic-based partial resource sensing method intended for use by a $5^{th}$ generation-new radio (5G-NR) sidelink (SL) communication system is provided. This can minimize the amount of SL resource sensing and monitoring operation that needs to be performed by a device with limited supply of battery power (e.g., smartphone, wearable device, augmented reality (AR)/virtual reality (VR) glasses and etc.) while not limiting the applicability of the user equipment (UE) autonomous resource allocation scheme in NR-SL to wide range of data traffics. Further, in some embodiments, the monitoring of SL resources in a SL resource pool is performed in a subset of periodic sensing occasions that corresponds to a limited number of candidate slots. In some embodiments, by further selecting only the occasions that align with SL-DRX cycle, the additional amount of time that a power saving UE needs to be awake for the sensing operation can be minimized.

As mentioned in the above embodiments, the main intention and purpose of NR-sidelink communication is to support a wide range of use cases and applications. Therefore, the design should not be limited by assuming only certain traffic pattern and characteristics. Since the number of possible resource reservation periods can be configured up to 16 different periodicities for use in a NR sidelink resource pool, ideally all resources in slots that fall within a sensing window according to these periodicities should be sensed by a sidelink transmitting UE. However, it is possible that some of network configured reservation periodicities can be as small as only a few milli-seconds (5 to 10 slots long). If to cover all possible combinations of resource reservation periods allowed in a resource pool and periodic sensing occasions (gap sensing candidates) within a sensing window, the amount of power saving from performing partial sensing would be very minimal since NR-sidelink technology targets to support many new modern use cases and applications with very short air-interface latency. Essentially, this could result in no practical difference from performing the full sensing as in the current NR sidelink resource allocation design.

Instead, a subset of possible resource reservation periods allowed in a sidelink resource pool can be used for partial sensing (i.e., a set of one or more $P_{reserve}$ values). This subset could be configured by a network base station or pre-configured, or determined by the UE (e.g., up to UE implementation), containing at least one value that is the same as the resource reservation interval of UE's PSCCH/PSSCH transmission. As such, persistent sidelink transmission collisions can be avoided if only one value of resource reservation period is used for the partial sensing.

In addition, it is also not necessary for the UE to perform sensing in all of the possible periodic sensing occasions, where the set of all possible periodic sensing occasions corresponding to a resource reservation period ($P_{reserve}$) can be defined as:

$$\left[ 1, \dots, \mathrm{floor}\left( \frac{\text{configured sensing window start time}}{P_{reserve}} \right) \right].$$

Further, a subset of periodic sensing occasions (k) in which the UE can perform sensing may follow one of the following alternatives.

Alternative 1: only the most recent one or two occasions for each $P_{reserve}$ from the configured or determined subset of resource reservation periods need to be sensed by the UE within the sensing window (e.g. k=[1, 2]), where the 2 occasions could be used in case another UE dropped its SL transmission in one of the occasions and transmitted in the other (e.g., due to congestion control or lower priority compare to another SL or UL transmission).

Alternative 2: a subset of periodic sensing occasions for each $P_{reserve}$ from the configured or determined subset of resource reservation periods is UE selected (e.g., up to UE implementation) by considering a configured SL-discontinuous reception (DRX) cycle ON (active)/OFF (inactive) period/timer.

Figure 5:
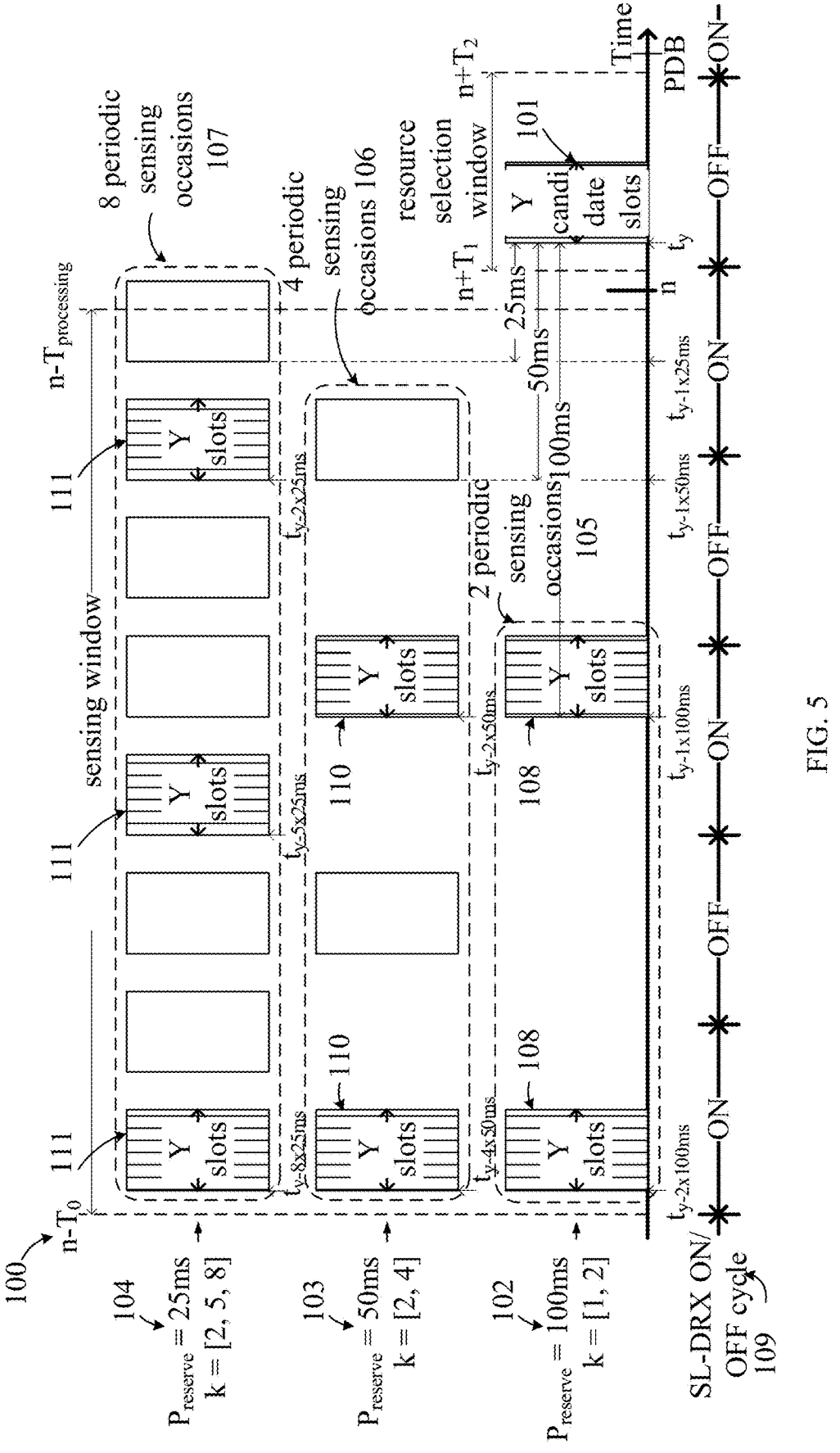
FIG. 5 is a schematic diagram illustrating an exemplary illustration of selecting periodic sensing occasions for partial sensing based resource allocation in NR sidelink mode 2 according to an embodiment of the present disclosure.

In reference to diagram 100 in FIG. 5, an exemplary illustration of selecting periodic sensing occasions based on the proposed SL sensing method for partial sensing based resource allocation in NR sidelink mode 2 is depicted. As illustrated in FIG. 5, in some embodiments, for a SL transmitting UE receiving a request from a higher layer in slot n to determine and report a subset of resources within a resource selection window $[n+T_1, n+T_2]$ for PSCCH/PSSCH transmission with a non-zero resource reservation interval, to reduce the amount of sensing that needs to be performed, the UE first determines a subset of Y candidate slots 101 within the resource selection window as its candidate target. However, the selection of Y candidate slots may not include any slot that the UE already has a planned transmission in SL or uplink (UL), since the UE cannot perform any additional transmission in SL in that slot. Furthermore, the determination of Y candidate slots 101 may be restricted by a minimum and/or a maximum number, and the start of Y candidate slots should be as early as possible from $n+T_1$.

In some embodiments, after the set of Y candidate slots within the resource selection window is determined, the UE determines a set of slots after the start of a sensing window $n-T_0$ for resource sensing/monitoring by decoding PSCCH and measuring RSRP levels. To is the configured sensing window start time. The selection of sensing slots is according to a configured set of $P_{reserve}$ values, which is a subset of a list of possible resource reservation periods allowed for the sidelink resource pool. In this case, the configured set of $P_{reserve}$ values include three values [25, 50, 100] ms as illustrated in 102, 103, and 104 in FIG. 5.

For $P_{reserve}=100$, the UE further identifies a set of 2 possible periodic sensing occasions 105 from the proposed derivation $$\left[ 1, \dots, \mathrm{floor}\left( \frac{T_0 = \text{configured sensing window start time}}{P_{reserve}} \right) \right] \to [1, 2],$$

where $T_0$ is assumed to be 200 ms. Furthermore, for each of the identified possible periodic sensing occasion 108, it includes Y slots that correspond to the set of Y candidate slots from the resource selection window according to $t_{y-k \times Preserve}$, for all $t_y$ slot belong to the set of Y candidate slots. Moreover, since both periodic sensing occasions (108's) fall within ON periods of a configured SL-DRX cycle 109, both are selected for sidelink resource sensing/monitoring. As such, the set of periodic sensing occasions (k) in which the UE can perform sensing is k=[1, 2] (102) for $P_{reserve}=100$.

Similarly, for $P_{reserve}=50$, the UE identifies a set of 4 possible periodic sensing occasions 106 as $$\left[ 1, \dots, \mathrm{floor}\left( \frac{T_0}{P_{reserve}} \right) \right] \to [1, 2, 3, 4].$$

In order to align sidelink resource sensing/monitoring slots as much as possible to the configured SL-DRX ON periods to achieve power saving, the UE selects 2 out of the 4 possible periodic sensing occasions 110. As such, the set of periodic sensing occasions (k) in which the UE can perform sensing is k=[2, 4] (as illustrated in 103 in FIG. 5) for $P_{reserve}=50$.

For $P_{reserve}=25$, the UE identifies a set of 8 possible periodic sensing occasions 107 as $$\left[ 1, \dots, \mathrm{floor}\left( \frac{T_0}{P_{reserve}} \right) \right] \to [1, 2, 3, 4, 5, 6, 7, 8].$$

Similarly, the UE selects 3 out of the 8 possible periodic sensing occasions (111's). As such, the set of periodic sensing occasions (k) in which the UE can perform sensing is k=[2, 5, 8] (as illustrated in 104 in FIG. 5) for $P_{reserve}=25$.

In summary, in some embodiments, to determine a set of slots for resource monitoring if partial sensing is configured in sidelink resource allocation mode 2 (as known as UE autonomous resource selection), the following methods/steps can be adopted to minimize the amount of sidelink sensing that a UE needs to perform for saving UE processing power. 1. UE physical layer receives a request/configuration to determine and report a subset of resources of a sidelink resource pool for PSCCH/PSSCH transmission. When a mode 2 resource allocation procedure is triggered in a slot n to determine a subset of resources for sidelink transmission, one or more of following parameters are provided by a higher layer of the UE, and the one or more of following parameters comprise a sidelink resource pool identifier and/or index; a first layer (L1) priority for the sidelink transmission $Prio_{Tx}$; a non-zero resource reservation interval for the sidelink transmission $P_{rsvp\_Tx}$; a minimum and/or maximum number of candidate slots for resource selection; a list of possible resource reservation periods allowed for the sidelink resource pool; or a sidelink discontinuous reception (DRX) active/inactive period and/or timer. 2. UE Determines a set of candidate slots (for resource selection) within a resource selection window, wherein the set of candidate slots may be bounded by the minimum and/or maximum value. 3. The set of $P_{reserve}$ is RRC configured by a network base station or pre-configured and comprises at least one value from the list of possible resource reservation periods allowed for the SL resource pool. The set of corresponding k for a $P_{reserve}$ value is at least the most recent one or two periodic sensing occasions within the sensing window, where periodic sensing occasions can be derived based on at least the determined set of candidate slots (for resource selection) and the $P_{reserve}$ value.

Commercial interests for some embodiments are as follows. 1. Solving issues in the prior art. 2. Reducing/limiting power consumption. 3. Providing good communication performance. 4. Providing high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, smart watches, wireless earbuds, wireless headphones, communication devices, remote control vehicles, and robots for public safety use, AR/VR device maker for example gaming, conference/seminar, education purposes, smart home appliances including TV, stereo, speakers, lights, door bells, locks, cameras, conferencing headsets, and etc., smart factory and warehouse equipment including IIoT devices, robots, robotic arms, and simply just between production machines. In some embodiments, commercial interest for the disclosed invention and business importance includes lowering power consumption for wireless communication means longer operating time for the device and/or better user experience and product satisfaction from longer operating time between battery charging. Some embodiments of the present disclosure are a combination of "techniques/processes" that can be adopted in 3GPP specification to create an end product. Some embodiments of the present disclosure relate to mobile cellular communication technology in 3GPP NR Release 17 and beyond for providing direct device-to-device (D2D) wireless communication services.

Figure 6:
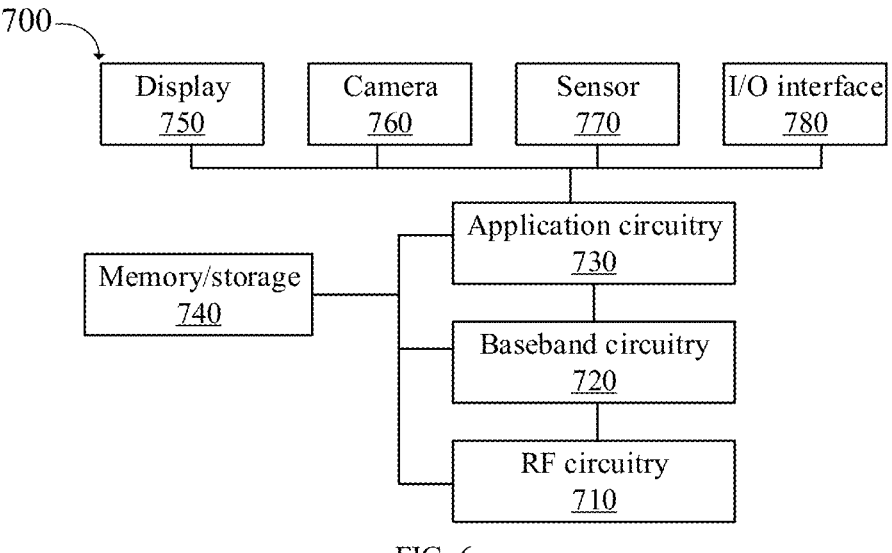
FIG. 6 is a block diagram of a system for wireless communication according to an embodiment of the present disclosure.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A resource monitoring method in sidelink communication by a user equipment (UE), comprising:
   selecting a set of candidate slots within a resource selection window of a sidelink resource pool when partial sensing is configured in the UE by a higher layer; and
   monitoring a slot $t_{y-k\times Preserve}$ in the sidelink resource pool for a set of $P_{reserve}$ and a set of k no earlier than $n-T_0$, wherein a slot $t_y$ is in the set of candidate slots, the set of $P_{reserve}$ comprises a subset of resource reservation periodicities, the set of k corresponds to one or more periodic sensing occasions, and $T_0$ is a length of a sensing window, and wherein the UE is triggered in slot n to determine a subset of resources for sidelink transmission.

2. The method of claim 1, wherein when a mode 2 resource allocation procedure is triggered in a slot n to determine a subset of resources for sidelink transmission, one or more of following parameters are provided by a higher layer of the UE, and the one or more of following parameters comprise a sidelink resource pool identifier and/or index; a first layer (L1) priority for the sidelink transmission $Prio_{Tx}$; a non-zero resource reservation interval for the sidelink transmission $P_{rsvp\_Tx}$; a minimum and/or maximum number of candidate slots for resource selection; a list of possible resource reservation periods allowed for the sidelink resource pool; or a sidelink discontinuous reception (DRX) active/inactive period and/or timer.

3. The method of claim 2, wherein the set of $P_{reserve}$ comprises at least one value from the list of possible resource reservation periods allowed for the sidelink resource pool.

4. The method of claim 1, wherein the set of candidate slots is bounded by a minimum and/or maximum value.

5. The method of claim 1, wherein the set of $P_{reserve}$ is radio resource control (RRC) configured by a base station or pre-configured.

6. The method of claim 1, wherein the set of k corresponds to at least most recent one or two periodic sensing occasions for a given periodicity $P_{reserve}$.

7. The method of claim 1, wherein the periodic sensing occasions are derived based on the set of candidate slots, the set of $P_{reserve}$, and the set of k.

8. The method of claim 1, wherein monitoring the slot $t_{y-k\times Preserve}$ in the sidelink resource pool for the set of $P_{reserve}$ the set of k comprises monitoring sidelink resources in a subset of periodic sensing occasions when a sidelink DRX is configured.

9. The method of claim 8, further comprising selecting only subset of periodic sensing occasions aligning with a sidelink DRX cycle.

10. The method of claim 2, wherein the sidelink transmission comprises a physical sidelink control channel (PSCCH) and/or physical sidelink shared channel (PSSCH) transmission.

11. The method of claim 10, wherein after determining the set of candidate slots within the resource selection window, the method further comprises resource monitoring by decoding a PSCCH and measuring a reference signal received power (RSRP) level.

12. A user equipment (UE), comprising:
   a memory;
   a transceiver; and
   a processor coupled to the memory and the transceiver;

wherein the processor is configured to select a set of candidate slots within a resource selection window of a sidelink resource pool when partial sensing is configured in the UE by a higher layer; and wherein the processor is configured to monitor a slot $t_{y-k \times Preserve}$ in the sidelink resource pool for a set of $P_{reserve}$ and a set of k no earlier than $n-T_0$, wherein a slot $t_y$ is in the set of candidate slots, the set of $P_{reserve}$ comprises a subset of resource reservation periodicities, the set of k corresponds to one or more periodic sensing occasions, and $T_0$ is a length of a sensing window, and wherein the UE is triggered in slot n to determine a subset of resources for sidelink transmission.

13. The UE of claim 12, wherein when a mode 2 resource allocation procedure is triggered in a slot n to determine a subset of resources for sidelink transmission, one or more of following parameters are provided by a higher layer of the UE, and the one or more of following parameters comprise a sidelink resource pool identifier and/or index; a first layer (L1) priority for the sidelink transmission $Prio_{Tx}$; a non-zero resource reservation interval for the sidelink transmission $P_{rsvp\_Tx}$; a minimum and/or maximum number of candidate slots for resource selection; a list of possible resource reservation periods allowed for the sidelink resource pool; or a sidelink discontinuous reception (DRX) active/inactive period and/or timer.

14. The UE of claim 13, wherein the set of $P_{reserve}$ comprises at least one value from the list of possible resource reservation periods allowed for the sidelink resource pool.

15. The UE of claim 12, wherein the set of $P_{reserve}$ is radio resource control (RRC) configured by a base station or pre-configured.

16. The UE of claim 12, wherein the set of k corresponds to at least most recent one or two periodic sensing occasions for a given periodicity $P_{reserve}$.

17. The UE of claim 12, wherein the periodic sensing occasions are derived based on the set of candidate slots, the set of $P_{reserve}$, and the set of k.

18. The UE of claim 12, wherein monitoring the slot $t_{y-k \times Preserve}$ in the sidelink resource pool for the set of $P_{reserve}$ the set of k comprises monitoring sidelink resources in a subset of periodic sensing occasions when a sidelink DRX is configured.

19. The UE of claim 18, wherein the processor is further configured to select only subset of periodic sensing occasions aligning with a sidelink DRX cycle.

20. A non-transitory machine-readable storage medium having stored thereon instructions that, when executed by a computer, cause the computer to:

select a set of candidate slots within a resource selection window of a sidelink resource pool when partial sensing is configured in a UE by a higher layer; and monitor a slot $t_{y-k \times Preserve}$ in the sidelink resource pool for a set of $P_{reserve}$ and a set of k no earlier than $n-T_0$, wherein a slot $t_y$ is in the set of candidate slots, the set of $P_{reserve}$ comprises a subset of resource reservation periodicities, the set of k corresponds to one or more periodic sensing occasions, and $T_0$ is a length of a sensing window, and wherein the UE is triggered in slot n to determine a subset of resources for sidelink transmission.

* * * * *